(12) United States Patent
Miller

(10) Patent No.: US 6,543,827 B2
(45) Date of Patent: Apr. 8, 2003

(54) CLIMATE CONTROLLED BEVERAGE TRUCK

(75) Inventor: Gerard V. Miller, North Branch, MI (US)

(73) Assignee: Webasto Thermosystems, Inc., Lapeer, MI (US)

( * ) Notice: Subject to any disclaimer, the term of this patent is extended or adjusted under 35 U.S.C. 154(b) by 0 days.

(21) Appl. No.: 09/874,321

(22) Filed: Jun. 6, 2001

(65) Prior Publication Data

US 2002/0185880 A1 Dec. 12, 2002

(51) Int. Cl.[7] .............................. F24F 7/007; B60P 3/20
(52) U.S. Cl. ....................... 296/24.1; 296/181; 454/90; 454/103; 454/118; 62/263
(58) Field of Search .................. 296/24.1, 181, 296/183; 410/129; 454/88, 89, 90, 95, 103, 118, 185; 62/239, 263, 441, 454, 456, 407

(56) References Cited

U.S. PATENT DOCUMENTS

| | | | | | |
|---|---|---|---|---|---|
| 1,013,517 A | * | 1/1912 | Robbins et al. | ............... | 165/42 |
| 2,006,069 A | * | 6/1935 | Day | ............................ | 454/90 |
| 2,299,177 A | * | 10/1942 | Reilly | ......................... | 62/237 |
| 2,324,749 A | * | 7/1943 | Wieden | ....................... | 454/90 |
| 3,792,595 A | * | 2/1974 | Willis | ......................... | 454/103 |
| 4,399,737 A | * | 8/1983 | Severson | .................... | 165/139 |
| 4,532,774 A | * | 8/1985 | Burns | ...................... | 280/415.1 |
| 4,553,403 A | * | 11/1985 | Taylor | ......................... | 34/225 |
| 5,564,287 A | * | 10/1996 | Hearne et al. | ................ | 62/237 |
| 5,704,676 A | * | 1/1998 | Hill | ............................ | 296/181 |

* cited by examiner

Primary Examiner—D. Glenn Dayoan
Assistant Examiner—Patricia L. Engle
(74) Attorney, Agent, or Firm—Nixon Peabody LLP; David S. Safran

(57) ABSTRACT

A truck with a heating/cooling climate control system that is effectively integrated into a trailer or straight truck body, even as an after-market/field installation, which provides a uniform temperature distribution throughout the truck. An air flow which is sufficient to maintain the proper temperature environment throughout the entire beverage storage areas of the trailer or straight truck body is achieved without ducting of the supply air flow.

12 Claims, 5 Drawing Sheets

CLIMATE CONTROLLED BEVERAGE TRUCK

BACKGROUND OF THE INVENTION

1. Field of the Invention

The present invention relates to beverage trucks of the straight truck and trailer truck types that are used to transport cases of beverages. In particular, the invention is directed to such trucks in which a heating and/or cooling system is provided in a front bulkhead wall of the truck body and an air distribution system is provided within the truck body for directing a flow of heated/cooled air throughout the interior of the body to insure that beverages stored within all of areas of the truck body are maintained at a suitable temperature.

2. Description of Related Art

A problem faced by the beverage distribution industry is that the trucks used to deliver cases of beverages are loaded at the distribution center, e.g., a warehouse, at the end of the day after the trucks have returned from making the day's deliveries, so that the fully-loaded trucks are ready to commenced deliveries first thing the following day. This means that the beverages sit in the trucks overnight. Without climate control measures being taken within the truck body, in cold climates where temperatures can fall well below freezing in winter, unless adequate heat is delivered throughout the interior of the truck body, the beverages in the trucks can freeze overnight, rupturing their containers or being damaged by the freezing effects themselves. Similarly, in hot climates where temperatures can remain quite hot even at night, without cooling air being circulated through the truck body, heat-sensitive beverages can spoil due to the effect of heat building up in the truck body during the during daylight hours and not dissipating significantly overnight.

To address this problem, for example, a fuel-fired heater is mounted in the front bulkhead wall of the truck body. However, beverage trucks are not standard production line vehicles of vehicle manufacturers, a trailer manufacturer making the truck body and having to adapt a heater manufacturer's product to a vehicle for which the heater was not specifically designed, e.g., the heater is not matched to any duct system that may have been constructed by the trailer manufacturer. Further complicating distribution of heated air is the fact that the interior of a beverage truck body is partitioned, into a number of bays within which the beverage cases are stacked, by a longitudinal partition running down the center of the interior of the truck body and a plurality of laterally running transverse partitions.

In one known arrangement produced by the company Safetec (Hunter), Model ST37-20, a heater is mounted centrally near the top of the front wall of the truck body and delivers heated air into the interior of the truck body at a height above the longitudinally and laterally running partitions. Fans are mounted above each of the even numbered laterally running partitions (i.e., second, fourth . . . ) and distributes the heated air downward into a respective pair of bays. To enable cold air to be drawn back to the heater, four stack openings are provided near a bottom corner of the laterally running partitions near the longitudinally running partition. However, this arrangement possess the disadvantage that due to heated/supply air not reaching the floor area near the outer wall bay doors, and the holes and routing not being sized to accommodate the system's air volume, uneven and inefficient heating results.

In another know approach, used, e.g., by Hackney & Sons, Mickey Truck Bodies and Hesse, a main duct receives heated/supply air from the heater outlet and ducts it the length of the trailer or straight truck above the center partition. Branches lead from the main duct through the individual bay walls down to just above floor level where the heated/supply air is delivered into the bays by vents located about a meter (3.1 feet) into the bays from the bay doors. Air return is through holes in an upper portion of the center partition, along the interior of the center partition and into the front bulkhead. Here again, the return air routing is not sized to accommodate the system's air volume, and uneven and inefficient heating results.

Other approaches that have been tried included directing the heated/supply air through the center partition (using the center partition as a duct) and out into the bays through holes formed in the partition walls at each bay, or circulating heated coolant in the floor with no interior thermostat, i.e., with a 100% heater duty cycle. The partition walls being made of aluminum, the first of these two approaches is limited to a short span of air routing since the aluminum construction quickly absorbs the heat, while floors that have heated coolant circulated in them are susceptible to coolant leaks and the coolant adds weight which reduces the product load that can be transported by the truck.

SUMMARY OF THE INVENTION

In view of the foregoing, it is a primary object of the present invention to enable a beverage truck to be effectively climate controlled.

More specifically, it is an object of the present invention to develop a heating/cooling system that can be effectively integrated into a trailer or straight truck body, even as an after-market/field installation, which provides a uniform temperature distribution throughout the truck.

In connection with the foregoing, it is a further object of the invention to provide the necessary air flow within the complete trailer or straight truck to maintain the proper temperature environment throughout the entire beverage storage areas without ducting of the supply air flow.

The above and other objects of the invention are obtained by integrating a heat exchanger mounted in the front wall of the trailer or straight truck with an air distribution system which delivers heated/supply air to each bay floor by the door in an unducted manner and return flow routing from the floor area near the bay doors through the partitioning back to and through the front bulkhead to the heat exchanger with the return air holes being correctly sized with respect to truck size and insulation properties/irregularities.

By using an unducted air supply, the necessary air flow can be circulated completely within all of the beverage storage areas without substantial heat loss. Furthermore, costs are reduced since no main ducting is required and existing body construction is used channeling return air flow construction. This, in turn, enables retrofit installation into the truck body to be facilitated.

These and other objects, features and advantages will become apparent from the following descriptions and the accompanying drawings which show, for purposes of explanation, several embodiments in accordance with the present invention.

DETAILED DESCRIPTION OF THE INVENTION

Figure 1:
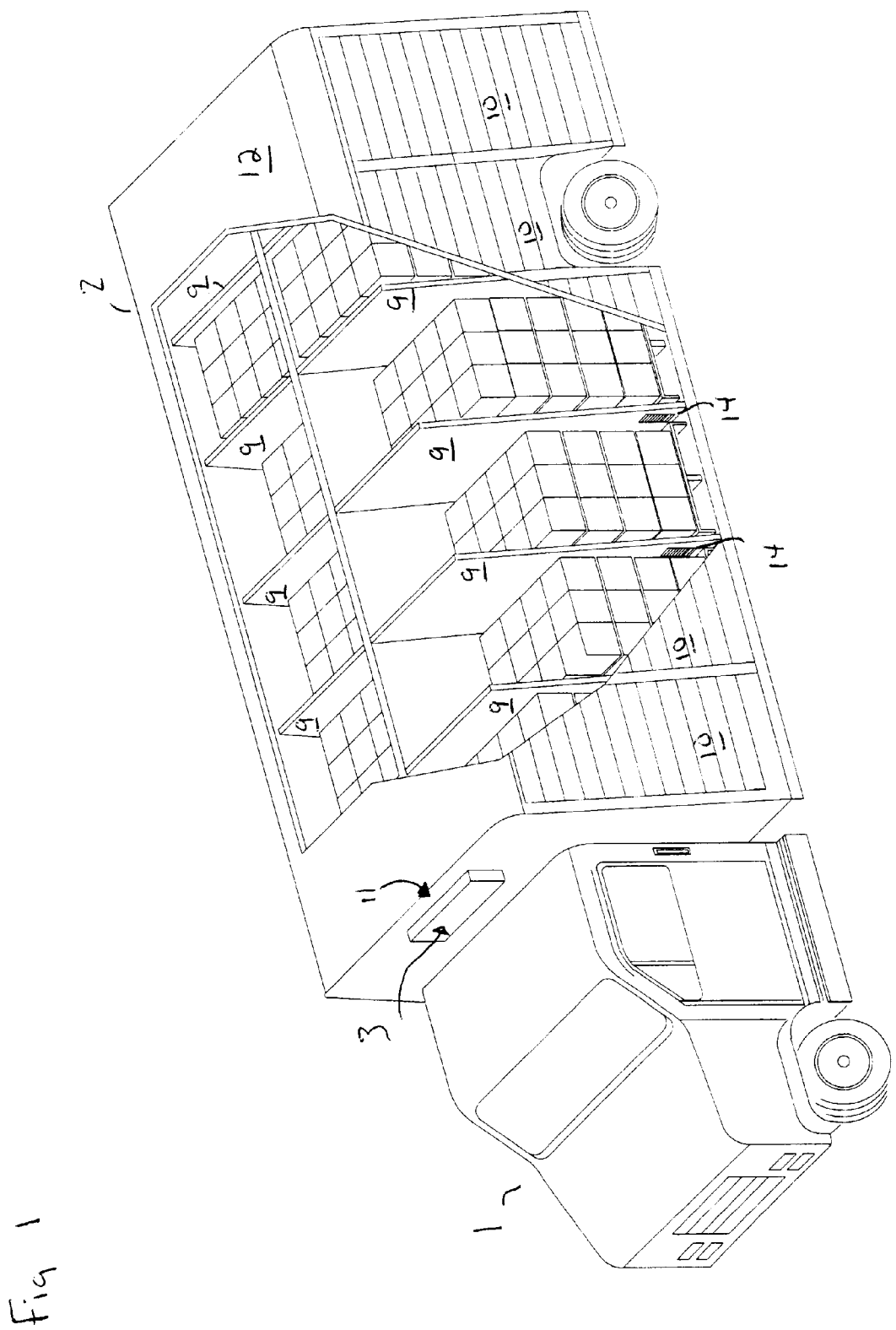
FIG. 1 is a perspective, partially broken-away view of a beverage truck in accordance with the invention.

FIG. 1 shows a truck 1 with body 2 having a heat exchanger 3 mounted in its front wall 5. The interior space of the vehicle body is subdivided into a number of bays by a central partition wall 7 which extends in a lengthwise direction of the vehicle body 2 and bay partition walls 9 which extend laterally outward from the central partition wall 7. Bay doors 10 are provided in side walls of the vehicle body 2 for providing exterior access to the bays. In FIG. 1, cases of, e.g., beverages, are shown stacked in the bays.

The heat exchanger 3 can be of any commercially available heating and/or air conditioning design which, as is conventional and thus need not be explained in detail, has an air intake, air discharge outlets 11 and fans which draw air in via the air intake, pass the air over a heat exchanger coil or the like through which a heat exchange medium is circulated, and out through the air discharge outlets 11. In accordance with the invention, the air supply from the air discharge outlets 11 is delivered the floor area of each bay 9 by a an air distribution system in an unducted manner as will now be described with reference to FIGS. 2–5.

Figure 2:
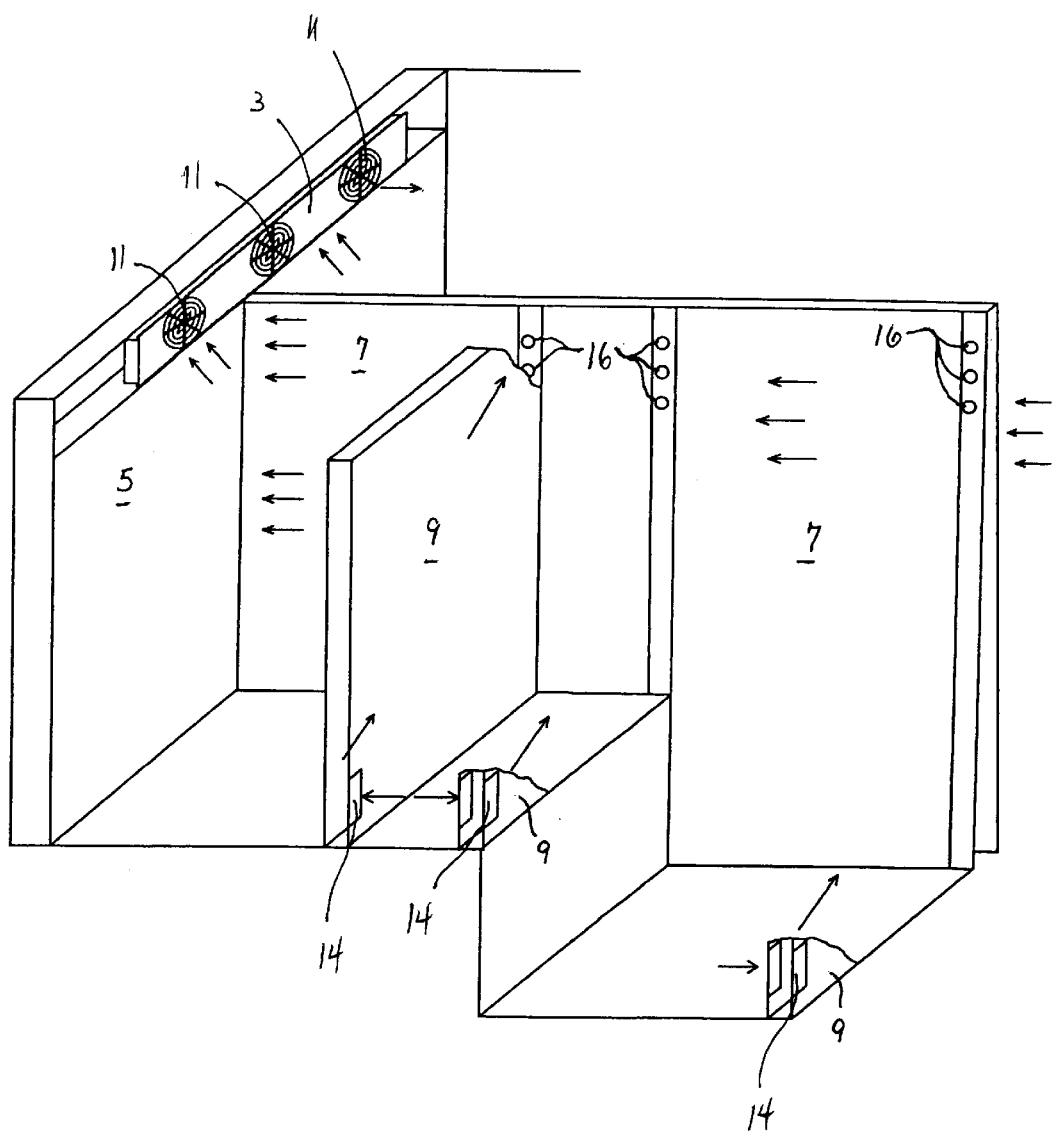
FIG. 2 is a perspective view showing a portion of the interior of a beverage truck in accordance with the present invention for incorporation of the return ducts during vehicle construction.

The air distribution system comprises an open space disposed between a ceiling 12 of the vehicle body 2 and a top end of the partitioning that is approximately 8–14 inches high. Since this open space is downwardly open to the baysyby providing return air openings 14 located in lower outer corner areas of bay partition walls the supply air will be drawn down into and across the bays to these return air openings 14. As shown, a single return air opening 14 is provided at both the front and rear side of each bay partition wall 9. However, more than one opening 14 can be provided and the locations of the openings 14 at the front and back sides of each bay partition wall need not be matched. What is important is that locations and sizes of the return air openings 14 be coordinated with respect to the size, insulation properties and irregularities of the truck body. In this regard, it is advantageous to achieving of proper air distribution if the total area of all of the return air openings 14 substantially equals the intake area of the heat exchanger air intake, e.g., 100 inches. In an ideal situation, the return air opening(s) for each bay would have an area equal to the intake area of the heat exchanger air intake divided by the number of bays within the truck body. However, for example, if all of the bays are not of equal size or if some of the bays are subject to greater heat loss, it may be preferable to decrease the size of the openings in some bays and increase the size of the openings in other bays while still maintaining the total area of all of the return air openings substantially equal to the intake area of the heat exchanger air intake. By way of example only, an air supply of 2040 $m^3h$/1,200 CFM±20% CFM would provide a sufficient air supply for trailers and 1190 $m^3h$/700 CFM±20% CFM for would provide a sufficient air supply for straight trucks A return flow air path extends from the return air openings 14 through the bay partition walls 9 to within an interior space of the central partition wall 7, along the interior space of the central partition wall 7 to within the front wall 5, and then, from within the front wall 5 to the heat exchanger intake. In the case where the return flow air path is being created during construction of the truck body, i.e., during new vehicle manufacture, as shown in FIG. 2, openings 16 can be formed in the side of the central partition 7, along its zone of intersection with the bay partition walls 9, which enable the return air to pass directly from within the bay partition walls 9 into the interior space of the central partition wall 7.

Figure 3:
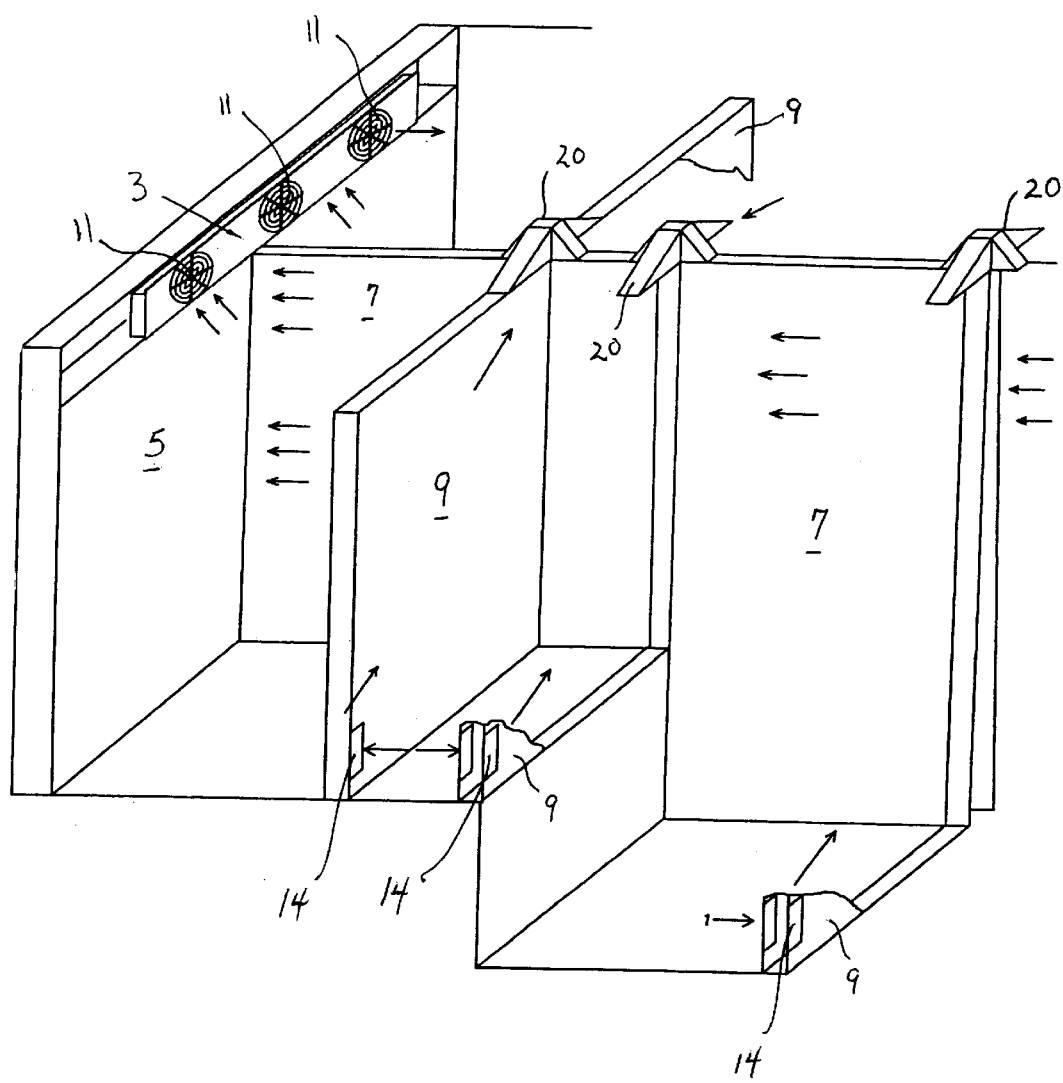
FIG. 3 is a perspective view showing a portion of the interior of a beverage truck similar to that of FIG. 2, but showing an embodiment for retrofit installation of the return ducts in an existing vehicle body.

On the other hand, when an existing vehicle body is to be retrofit equipped in accordance with the present invention, as shown in FIG. 3, openings are provided in the top edge of the partition walls 7, 9 and a vertically tapered, generally cruciform shaped, hollow cap member 20 is mounted on top of the central partition wall and the bay partition walls at the areas at which the bay partition walls intersect the central partition wall. These top cap members 20 not only serve to channel the return air flow from the bay partition walls 9 into the central partition wall 7, but also serve to strengthen the partition walls 7, 9 which have been weakened somewhat by the openings cut into the top edge areas thereof.

Figure 4:
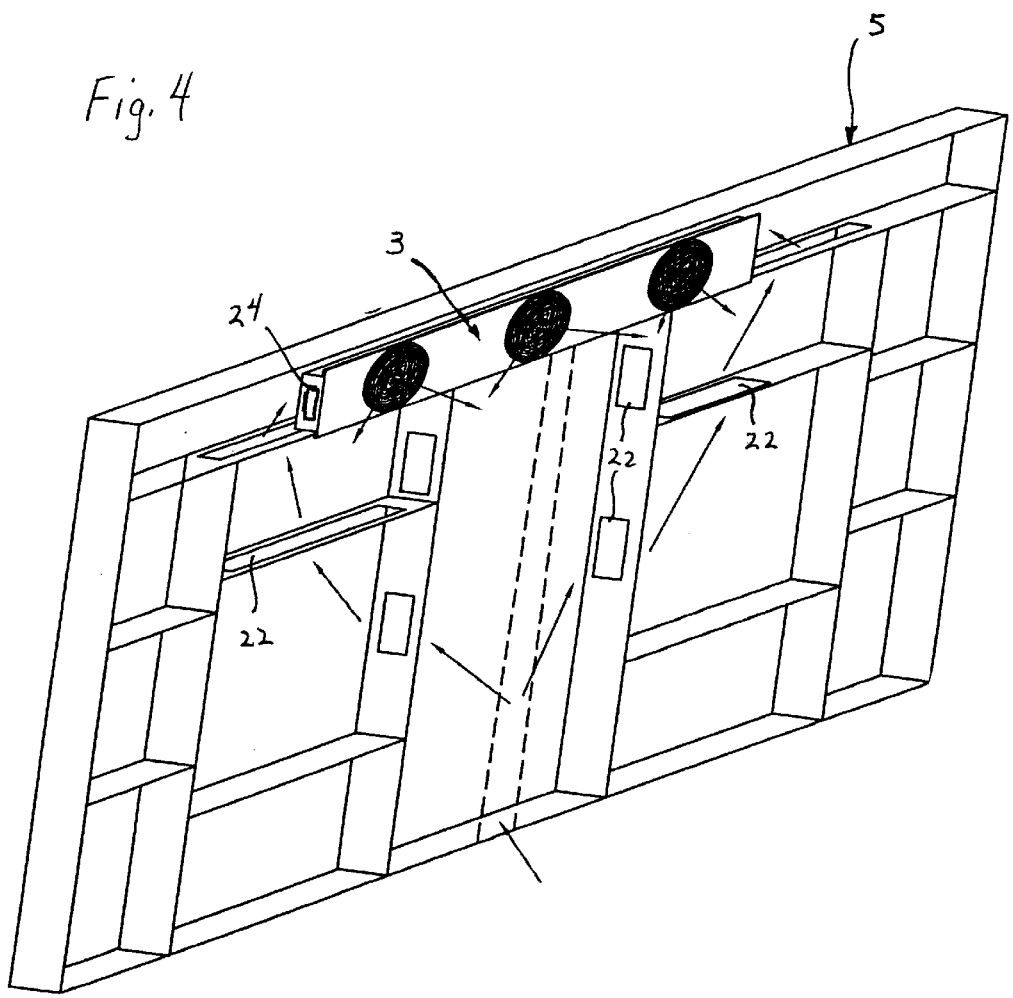
FIG. 4 is plan view diagram illustrating distribution and return air paths.

Once in the central partition wall 7, the return air flow is drawn by the heat exchanger fan(s) toward and into the front wall 5 of the vehicle body. The dashed line in FIG. 4 represents the area of intersection of the central partition wall 7 with the front wall 5. As also shown, openings 22 are provided in the bulkhead wall supports which allow the return air to flow (as represented by the arrows in FIG. 4) up and into the heat exchanger via its intake opening(s) 24, only one of which is represented in the drawings.

Figure 5:
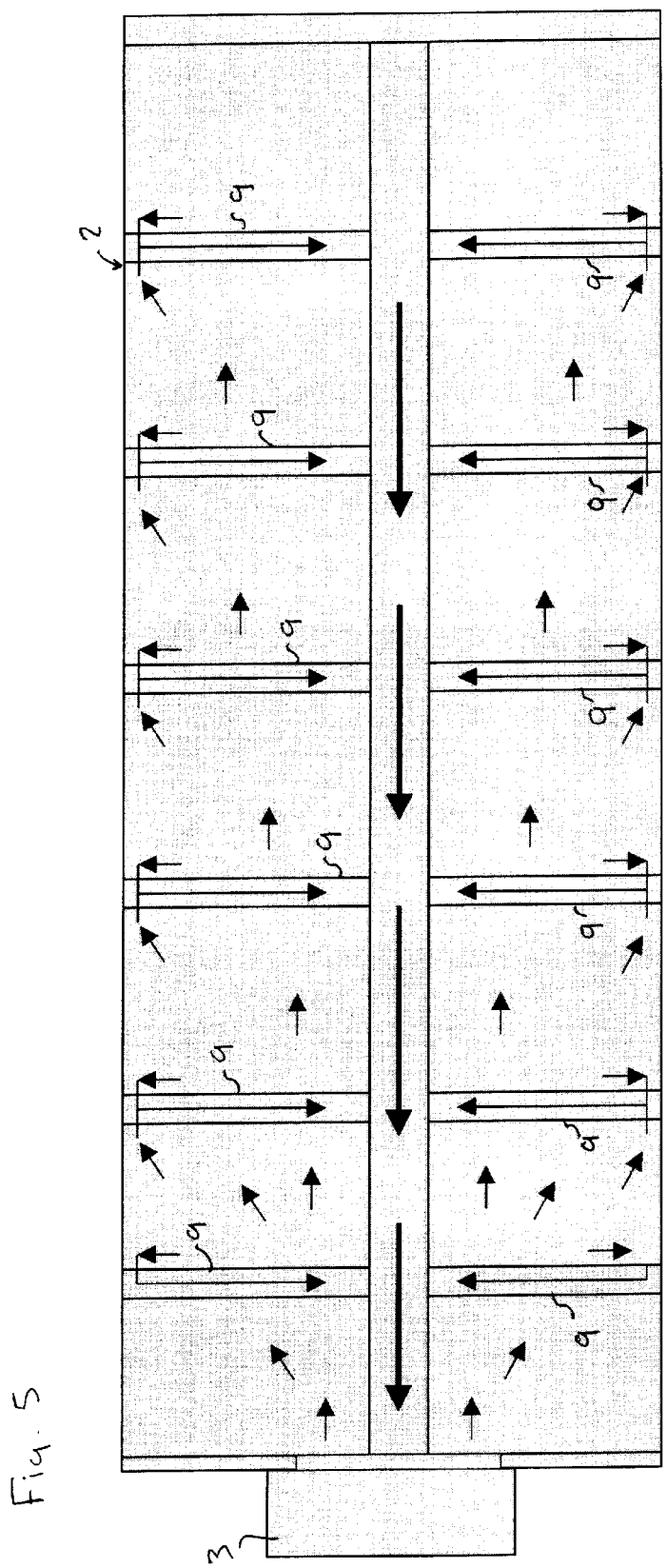
FIG. 5 is the return air flow through the bulkhead wall to the heat exchanger assembly.

The overall air flow distribution and return flow paths are represented in FIG. 5 where the short arrows represent the distribution flow of air to the bays and the long arrows represent the return flow path. The air from the heat exchanger 3 flows ductlessly, in an unrestricted manner, both along the length of the vehicle body 2 and laterally outwardly and downwardly to the floor of each bay by the bay door. While this distribution system is effective with cooling air in trucks for items requiring refrigeration, it is particularly advantageous for truck body interior heating systems because the heating system receives the coldest air to heat, the return air being drawn in near the floor by the doors, while the heated air is not cooled in route to the bays by heat being absorbed by the partition construction of other ducting due to the supply air being able to flow freely in an unrestricted air path above the partition system.

Furthermore, because the supply and return air systems are ductless, the invention is particularly adapted to retrofit installation into trucks having a vehicle body with partitioning of the type described, i.e., that is formed of a central partition wall extending in a lengthwise direction of the vehicle body and bay partition walls extending laterally outward from the central partition wall to define a number of bays within the interior space of the vehicle body. To retrofit an existing vehicle body of this type, the heat exchanger 3 is mounted in the front wall 5 of the vehicle body with air intakes of the heat exchanger 3 being arranged to receive return air from the interior space of the front wall 5, and at a height above the partition walls 7, 9, so that supply air from the heat exchanger 3 can pass into the space above the partition walls in an unducted manner. A return flow air path from the floor area near the respective bay door through the partitioning back to and through the front wall to the heat exchanger is created by providing return air openings in the bay partitioning partition walls that are located and sized with respect to size, insulation properties and irregularities of the truck body to assure proper distribution. The openings are cut in the top edges of the partition walls in the area where they intersect, and hollow return cap members 20 are mounted on top of the central partition wall and the bay partition walls at these areas for producing a connection for return air flow from within the bay partition walls 9 into the interior space of the central partition wall 7.

It is to be understood that although preferred embodiments of the invention have been described, various other embodiments and variations may occur to those skilled in the art. Accordingly, any such other embodiments and variations which fall within the scope and spirit of the present invention are intended to be covered by the following claims.

What is claimed is:

1. A truck, comprising a vehicle body, a heat exchanger mounted in a front wall of the vehicle body having partitioning defining a number of bays within an interior space of the vehicle body, bay doors being provided in side walls of the vehicle body for providing exterior access to the bays, and an air distribution system which delivers supply air to a floor area of each bay near a respective one of the bay doors in an unducted manner, and a return flow air path being provided from the floor area near the respective bay door through the partitioning back to and through the front wall to the heat exchanger, return air openings being provided in said partitioning at locations and of sizes coordinated with respect to size, insulation properties and irregularities of the vehicle body so as to provide a uniform temperature distribution throughout the bays of the truck.

2. A truck according to claim 1, wherein the air distribution system comprises an open space disposed between a ceiling of the vehicle body and a top end of said partitioning, said open space being downwardly open to said bays.

3. A truck according to claim 2, wherein said partitioning comprises a central partition wall extending in a lengthwise direction of the vehicle body and bay partition walls extending laterally outward from said central partition wall; wherein said return air openings are located in lower outer corner areas of said bay partition walls; and wherein said return flow air path extends from said return air openings through the bay partition walls to within an interior space of the central partition wall, along the interior space of the central partition wall to within said front wall and from within said front wall to said heat exchanger.

4. A truck according to claim 3, wherein said return flow air path passes directly from the bay partition walls into the interior space of the central partition wall.

5. A truck according to claim 3, wherein said return flow air path passes from the bay partition walls into the interior space of the central partition wall via cap members which sit on top of the central partition wall and the bay partition walls at areas at which the bay partition walls intersect the central partition wall.

6. A truck according to claim 1, wherein said partitioning comprises a central partition wall extending in a lengthwise direction of the vehicle body and bay partition walls extending laterally outward from said central partition wall; wherein said return air openings are located in lower outer corner areas of said bay partition walls; and wherein said return flow air path extends from said return air openings through the bay partition walls to within an interior space of the central partition wall, along the interior space of the central partition wall to within said front wall and from within said front wall to said heat exchanger.

7. A truck according to claim 6, wherein said return flow air path passes directly from the bay partition walls into the interior space of the central partition wall.

8. A truck according to claim 6, wherein said return flow air path passes from the bay partition walls into the interior space of the central partition wall via cap members which sit on top of the central partition wall and the bay partition walls at areas at which the bay partition walls intersect the central partition wall.

9. A truck according to claim 6, wherein the heat exchanger has an air intake with a given intake area, wherein the return air openings comprise at least one return air opening for each bay, and wherein the total area of all of the return air openings substantially equals the intake area of the heat exchanger air intake.

10. A truck according to claim 9, wherein the at least one return air opening for each bay has an area equal to the intake area of the heat exchanger air intake divided by the number of bays within the truck body.

11. A method of retrofit installing a climate control system into a truck having a vehicle body with partitioning that is formed of a central partition wall extending in a lengthwise direction of the vehicle body and bay partition walls extending laterally outward from said central partition wall and that defines a number of bays within an interior space of the vehicle body, and bay doors provided in side walls of the vehicle body for providing exterior access to the bays, comprising the steps of:

providing a heat exchanger mounted in a front wall of the vehicle body with air intakes thereof connect to an interior space of the front wall, and creating an air distribution system which delivers supply air to a floor area of each bay by a respective one of the bay doors in an unducted manner, and a return flow air path from the floor area near the respective bay door through the partitioning back to and through the front wall to the heat exchanger, by aligning outlets of the heat exchanger with an open space that is disposed between a ceiling of the vehicle body and a top end of said partitioning and that is downwardly open to said bays, by providing return air openings in said partitioning at locations and of sizes coordinated with respect to size, insulation properties and irregularities of the truck body so as to provide a uniform temperature distribution throughout the bays of the truck, and by mounting return cap members on top of the central partition wall and the bay partition walls at areas at which the bay partition walls intersect the central partition wall for producing a connection for return air flow from within the bay partition walls into the interior space of the central partition wall.

12. A method according to claim 11, wherein said step of providing return air openings in said partitioning in lower outer corner areas of said bay partition walls near said bay doors is performed such that the total area of all of the return air openings substantially equals the intake area of the heat exchanger air intake.

* * * * *